Nov. 11, 1969 J. F. COULEUR ET AL 3,478,324

DATA PROCESSING SYSTEM INCLUDING MEANS FOR DETECTING ILLEGAL ACTIONS AND GENERATING CODES IN RESPONSE THERETO

Filed Aug. 2, 1966

INVENTORS
JOHN F. COULEUR
RICHARD L. RUTH

BY William C. Cahill
Ronald E. Renner
Ronald M. O'Keefe

ATTORNEYS 3,478,324

DATA PROCESSING SYSTEM INCLUDING MEANS FOR DETECTING ILLEGAL ACTIONS AND GENERATING CODES IN RESPONSE THERETO

John F. Couleur and Richard L. Ruth, Phoenix, Ariz., assignors to General Electric Company, a corporation of New York Filed Aug. 2, 1966, Ser. No. 569,750
Int. Cl. G11b *13/00;* G08b *29/00*
U.S. Cl. 340—172.5 4 Claims

ABSTRACT OF THE DISCLOSURE

A data processing system including a plurality of subsystems, each connected exclusively to a memory controller. The subsystems include a data processor and a memory. The subsystems communicate exclusively through the memory controller which includes a monitoring system for detecting errors in the coded information being transmitted. Upon detection of an error, the memory controller generates an illegal action code indicative of the type of error occurring and transmits the code to all connected subsystems. The memory controller also generates an illegal action pulse which is transmitted only to the subsystem sending the information with the error.

The present invention pertains to data processing systems, and more specifically, to those systems utilizing control means for controlling communication among the subsystems of the data processing system and wherein the control means recognizes illegal actions attempted by the subsystems.

A data processing system includes a data processor for manipulating data in accordance with the instructions of a program. The processor will receive an instruction, decode the instruction, and perform the operation indicated thereby. The operation is performed upon data received by the processor and temporarily stored thereby during the operation. The series of instructions are called a program and include decodable operations to be performed by the processor. The instructions of the program are obtained sequentially by the processor and, together with the data to be operated upon, are stored in memory devices.

The memory device may form any of several well-known types; however, most commonly, the main memory is a random access coincident current type having discrete addressable locations each of which provides storage for a word. The word may form data or instructions and may contain specific fields useful in a variety of operations. Normally, when the processor is in need of data or instructions it will generate a memory cycle and provide an address to the memory. The data or word stored at the addressed location will subsequently be retrieved and provided to the data processor.

A series of instructions comprising a program are usually "loaded" into the memory at the beginning of operation and thus occupies a "block" of memory which normally must not be disturbed until the program has been completed. Data to be operated upon by the processor in accordance with the instructions of the stored program is stored in other areas of memory and is retrieved and replaced in accordance with the decoded instructions.

Communication with the data processing system usually takes place through the media of input/output devices including such apparatus as magnetic tape handlers, paper tape readers, punch card readers, remote terminal devices (for time sharing and real time applications specific terminal devices may be designed to gain access to the data processing system). To control the receipt of information from input/output devices and to coordinate the transfer of information to and from such devices, an input/output control means is required. Thus, an input/output controller is provided and connects the data processing system to the variety of input/output devices. The input/output controller coordinates the information flow to and from the various input/output devices and also awards priority when more than one input/output device is attempting to communicate with the data processing system. Since input/output devices are usually electromechanical in nature and necessarily having much lower operating speed than the remainder of the data processing system, the input/output controller provides buffering to enable the processing system to proceed at its normal rate without waiting for the time consuming communication with the input/output device.

The data processing system thus described includes a processor, a memory, an input/output controller, and input/output devices. In many applications it may be found to be advantageous to utilize more than one processor and under most circumstances more than one block of memory may be used. Further, in those system configurations requiring a large number of input/output devices, a number of input/output controllers may be used each controlling a plurality of input/output devices.

To provide flexibility and also to coordinate the communication among the processor, memory device, and input/output controller, a memory controller may be utilized. A memory controller is the sole means of communication among the subsystems of the data processing system and receives requests for access to memory as well as specific requests for communication to other subsystems. The memory controller provides a means for coordinating the execution of operations and transfers of information among the subsystems and may also provide a means for awarding priority when accesses to memory are requested by more than one subsystem.

In data processing systems having several subsystems, the interaction of the subsystems, including independent operations as well as transfers of information, sometimes presents situations giving rise to attempted illegal actions. For example, in instances where a particular processor communicates a command reserved for a control processor, this illegal action, if not immediately detected, could cause substantial difficulty. Further, apparatus for detecting illegal action, if duplicated for all subsystems, could be unwieldly and expensive. The system of the present invention provides a unique arrangement wherein illegal actions are detected by the memory controller; the memory controller detects the illegal action, determines the type of illegal action, generates a code indicating the type of illegal action, and also generates an illegal action pulse.

The illegal action pulse is transmitted to the subsystem giving rise to the generation of the illegal action code. The illegal action code may be sent to all subsystems although it may only commonly be utilized by one subsystem. The receipt of an illegal action pulse by a subsystem causes the subsystems to "read" the illegal action code and interpret the code to determine the appropriate course of action. The subsystem may enter an error subroutine in a self-corrective action to either remedy the illegal action, ignore the illegal action, or cease operation and provide appropriate indications of the difficulty.

It is therefore an object of the present invention to provide a data processing system wherein illegal actions of subsystems are detected by a controller connected to the subsystems.

It is another object of the present invention to provide a data processing system wherein a memory controller is used to generate a code in response to an illegal course of action attempted by a connected subsystem.

It is a further object of the present invention to provide a data processing system wherein a memory controller, connected to a plurality of subsystems, detects illegal actions attempted by the subsystems and notifies the offending subsystem of the existence of an illegal action.

It is still another object of the present invention to provide a data processing system wherein a memory controller, connected to a plurality of subsystems, detects illegal actions attempted by the subsystems and notifies the offending subsystem of the existence of an illegal action and wherein the memory controller further encodes the specific type of illegal action and provides the code to the offending subsystem.

It is a further object of the present invention to provide a data processing system wherein the subsystems thereof do not need the capacity for recognizing illegal actions and wherein a memory controller assumes the burden of detecting illegal actions by each of the subsystems.

These and other objects of the present invention will become apparent to those skilled in the art as the description proceeds.

Certain portions of the apparatus herein disclosed are not of our invention, but are the inventions of: John F. Couleur, Philip F. Gudenschwager, Richard L. Ruth, William A. Shelly, and Leonard G. Trubisky, as defined by the claims of their application, Ser. No. 577,376, filed Sept. 6, 1966; John F. Couleur, as defined by the claims of his application, Ser. No. 581,467, filed Sept. 23, 1966; and John F. Couleur, Richard L. Ruth, and William A. Shelly, as defined by the claims of their application, Ser. No. 584,801, filed Oct. 6, 1966; all such applications being assigned to the assignee of the present application.

Description of figures

The present invention may more readily be described by reference to the accompanying drawings in which.

Figure 1:
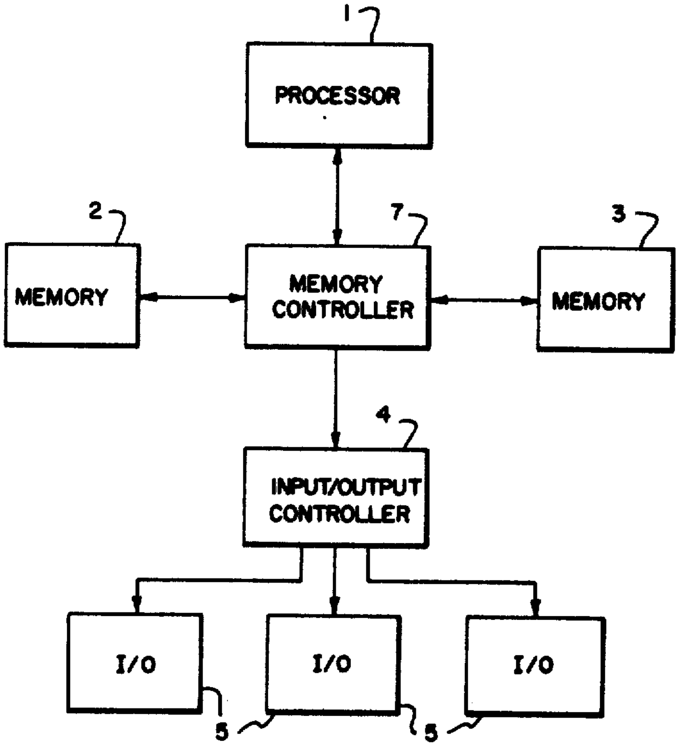
FIGURE 1 is a block diagram of a data processing system in a single memory controller configuration.

For a complete description of the system of FIGURE 1 and of my invention, reference is made to United States Patent No. 3,413,613 issued to David L. Bahrs, John F. Couleur, Richard L. Ruth, and William A. Shelly, on Nov. 26, 1968, and assigned to the assignee of the present invention. More particularly, attention is directed to FIGURES 2–120 and to the specification beginning at column 4, line 32 and ending at column 121, line 42, inclusive, of United States Patent No. 3,413,613, which are incorporated herein by reference and made a part hereof.

What is claimed is:

1. A data processing system including a memory controller and a plurality of subsystems, one of said subsystems being a data processor and one of said subsystems being a memory, all of said subsystems being connected exlusively to said memory controller; said subsystems communicating with each other by transmitting coded information through said memory controller; said memory controller responsive to errors in said coded information and to the subsystem sending said coded information with an error for generating an illegal action code and for transmitting said illegal action code to all of said subsystems; said memory controller including means responsive to the generation of said illegal action code for providing an illegal action pulse to the subsystem sending said coded information with an error.

2. A data processing system including a memory controller and a plurality of subsystems, one of said subsystems being a data processor and one of said subsystems being a memory, all of said subsystems being connected exlusively to said memory controller; said subsystems communicating with each other by transmitting coded information through said memory controller; said memory controller responsive to errors in said coded information and to the subsystem sending said coded information with an error for generating an illegal action code unique for each type of error detected and for transmitting said illegal code to all of said subsystems; said memory controller including means responsive to the generation of said illegal action code for providing an illegal action pulse to the subsystem sending said coded information with an error.

3. A data processing system including a memory controller and a plurality of subsystems, one of said subsystems being a data processor and one of said subsystems being a memory, all of said subsystems being connected exclusively to said memory controller; said subsystems communicating with each other by transmitting coded information through said memory controller; said memory controller responsive to errors in said coded information and to the subsystem sending said coded information with an error for generating an illegal action code unique for each type of error detected and for transmitting said illegal code to all of said subsystems; said memory controller including means responsive to the generation of said illegal action code for providing an illegal action pulse to the subsystem sending said coded information with an error; and at least one of said subsystems responsive to the receipt of an illegal action pulse for interpreting said illegal action code.

4. A data processing system including a memory controller and a plurality of subsystems, one of said subsystems being a data processor and one of said subsystems being a memory, all of said subsystems being connected exlusively to said memory controller; said subsystems communicating with each other by transmitting coded information through said memory controller; said memory controller responsive to errors in said coded information and to the subsystem sending said coded information with an error for generating an illegal action code unique for each type of error detected and for transmitting said illegal code to all of said subsystems; said memory controller including means responsive to the generation of said illegal action code for providing an illegal action pulse to the subsystem sending said coded information with an error; at least one of said subsystems responsive to the receipt of an illegal action pulse for interpreting said illegal action code and for entering a corrective subroutine.

References Cited

UNITED STATES PATENTS

| | | | |
|---|---|---|---|
| 3,245,045 | 4/1966 | Randley | 340—172.5 |
| 3,274,554 | 9/1966 | Hopper et al. | 340—172.5 |
| 3,303,474 | 2/1967 | Moore et al. | 340—172.5 |
| 3,323,109 | 5/1967 | Hecht et al. | 340—172.5 |
| 3,325,788 | 6/1967 | Hackl | 340—172.5 |
| 3,343,140 | 9/1967 | Richmond et al. | 340—172.5 |

GARETH D. SHAW, Primary Examiner

H. E. SPRINGBORN, Assistant Examiner

U.S. Cl. X.R.

340—146.1